La Barr, Hutchinson & Fleming,
Miter Box.

N° 77,053.  Patented Apr. 21, 1868.

Witnesses:  
Geo. D. Walker  
Geo. T. Pinckney

Inventors:  
George W. La Barr  
Aaron J. Hutchinson  
Ira W. Fleming  
per L. W. Serrell, Atty.

United States Patent Office.

GEORGE W. LA BAW AND IRA W. FLEMING, OF JERSEY CITY, NEW JERSEY, AND AARON T. HUTCHINSON, OF HARLEM, NEW YORK.

Letters Patent No. 77,053, dated April 21, 1868.

IMPROVEMENT IN MITRE-GAUGES.

The Schedule referred to in these Letters Patent and making part of the same.

TO ALL WHOM IT MAY CONCERN:

Be it known that we, GEORGE W. LA BAW and IRA W. FLEMING, of Jersey City, in the county of Hudson, and State of New Jersey, and AARON T. HUTCHINSON, of Harlem, in the county and State of New York, have invented, made, and applied to use, a certain new and useful Improvement in Mitre-Gauges; and we do hereby declare the following to be a full, clear, and exact description of the said invention, reference being had to the annexed drawing, making part of this specification, wherein—

Similar marks of reference denote the same parts.

Figure 2:
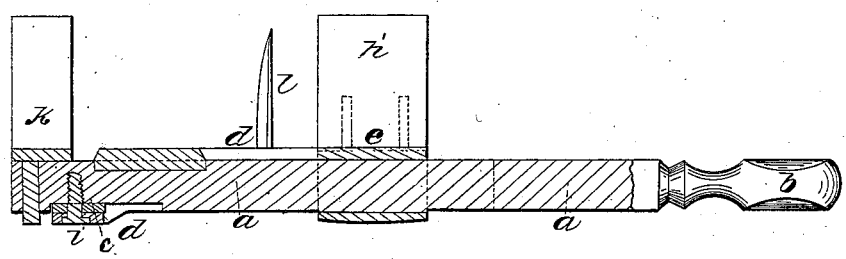
Figure 2 is a vertical longitudinal section of the same.
Figure 3:
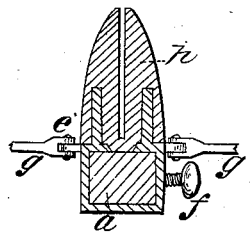
Figure 3 is a cross-section at the line $x$ $x$, fig. 1.
Figure 1:
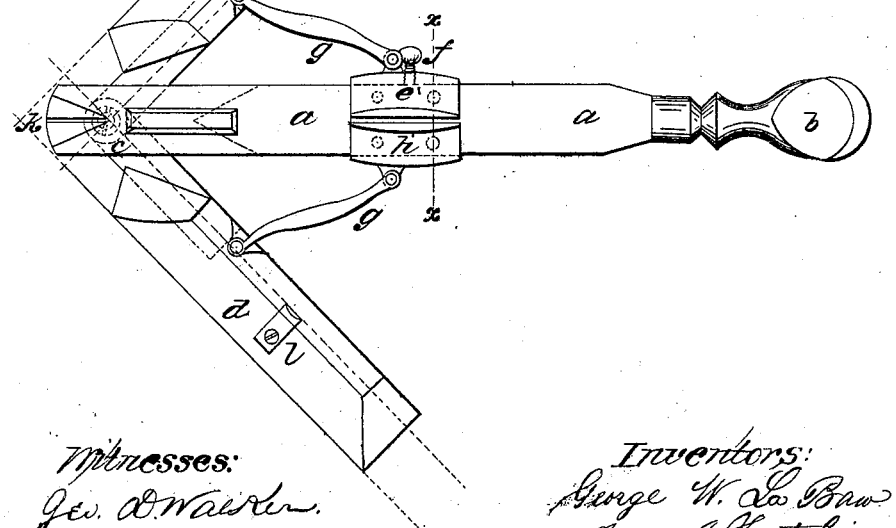
Figure 1 is a plan of said mitre-gauge.

Mitre-gauges have heretofore been made for bisecting an angle that is to receive a moulding, in order that said moulding may be sawed to the proper angle to fit into its place. Our invention is to accomplish this object with greater facility, and more reliably than heretofore.

The nature of our said invention consists in a pair of arms hinged to a stock, upon which is a sliding clamp that carries the saw-guide, and is connected by links with said hinged arms, so as to allow said hinged arms to be placed within and conformed to any angle to which a moulding is to be fitted, and at the same time insure the stock being in the correct position, midway between said arms, in order that the angle may be bisected, and hence that any moulding or ornament, sawed off in such gauge, shall properly mitre in such angle.

In the drawing, $a$ is a stock formed of wood or metal; I have shown one end, $b$, as a handle, to facilitate the using of the gauge.

$c$ $c$ are joints upon the ends of the arms $d$ $d$, united by one centre-pin or bolt, $i$, to the stock $a$, so that said arms $d$ can be swung off at right angles to said stock, or turned down at the side thereof, and thereby conform to any inclined angle.

$e$ is a slider that is clamped by a screw, $f$, to the stock $a$, after it has been adjusted, and $g$ $g$ are links hinged at their ends, respectively, to the arms $d$ and slider $e$, so that this slider $e$ will be moved along the stock $a$, as the arms $d$ are opened or closed to accommodate any angle into which a moulding is to be fitted, and these links $g$ cause the stock $a$ always to be centrally between the arms $d$.

The saw-guide, $h$, is made of wood, and attached to the sliding clamp $e$ by means of metal dowels on said clamp passing up into holes in said guide $h$. The object of this construction is to prevent the saw coming into contact with and being injured by any metal in the guide.

$k$ is the saw-guide for the other portion of the saw. This also is made of wood, and it is to be retained in a similar manner to the guide $h$, if the stock $a$ is made of metal.

$l$ are guides on the arms $d$ $d$, against which and the guide $k$ the material to be sawed is laid, and will occupy a position parallel to the edge of the arms $d$, in order that the sawing, through the guides $h$ and $k$, may be on a line that bisects the angle contained between the arms $d$, so that the mouldings will properly mitre together.

What we claim, and desire to secure by Letters Patent, is—

The arms $d$, jointed to the stock $a$, and connected by the links $g$ to the clamp $e$, that slides upon the stock $a$, in combination with the saw-guides $k$, at the joint $i$, and the saw-guide $h$, on the clamp $e$, substantially as and for the purposes set forth.

In witness whereof, we have hereunto set our signatures, this 14th day of August, A. D. 1867.

GEORGE W. LA BAW,
                                          AARON T. HUTCHINSON,
Witnesses:                                  IRA W. FLEMING.
    CHAS. H. SMITH,
    GEO. D. WALKER.